United States Patent [19]

Dor

[11] Patent Number: 4,595,505

[45] Date of Patent: Jun. 17, 1986

[54] METHOD FOR SUPPRESSING ALGAL GROWTH IN SOLAR PONDS

[75] Inventor: Inka Dor, Jerusalem, Israel

[73] Assignee: Solmat Systems, Ltd., Yavne, Israel

[21] Appl. No.: 615,480

[22] Filed: May 30, 1984

[51] Int. Cl.$^4$ .............. C02F 3/32; F24G 3/02; C12N 1/12

[52] U.S. Cl. .................. 210/602; 210/614; 210/709; 435/257; 435/259; 47/1.4; 126/415

[58] Field of Search .............. 210/602, 170, 611, 614, 210/709; 126/415, 452; 47/1.4; 435/259, 257

[56] References Cited

U.S. PATENT DOCUMENTS

| | | | |
|---|---|---|---|
| 3,914,437 | 10/1975 | Bellamy | 210/602 |
| 4,115,949 | 9/1978 | Avron et al. | 47/1.4 |
| 4,345,581 | 8/1982 | Shacher | 210/170 |
| 4,438,591 | 3/1984 | Kessler | 47/1.4 |
| 4,446,025 | 5/1984 | Assaf et al. | 210/602 |

FOREIGN PATENT DOCUMENTS 57-36981  2/1982  Japan .................. 435/257

*Primary Examiner*—Benoit Castel
*Attorney, Agent, or Firm*—Sandler & Greenblum

[57] ABSTRACT

A process for the reduction of undesirable levels of algal growth in salt water bodies in which an effective amount of treatment water is added at the surface of the salt water body. The treatment water has a salinity and density either greater or less than that of the water at the surface of the salt water body. As a result, algae which have become accustomed to the existing conditions of salinity and density undergo rupture of cells and settle to the bottom of the salt water body, if the water density has been decreased, or suffer lower reproduction rates, and eventually flocculate and settle to the bottom of the salt water body, if the water density has been increased.

6 Claims, 4 Drawing Figures

EFFECT OF DILUTION ON MOTILITY OF <u>DUNALIELLA</u>: MEAN OF THREE EXPERIMENTS

CELLS REMAINING IN SUSPENSION IN DISTILLED WATER DILUTED CULTURES OF <u>DUNALIELLA</u>: MEAN OF THREE EXPERIMENTS.

EFFECT OF DILUTION ON <u>DUNALIELLA</u> CELLS ACCUMULATION AT THE TEST TUBE BOTTOM: MEAN OF THREE EXPERIMENTS.

GROWTH OF DUNALIELLA IN DILUTED MEDIA
FIFTH DAY: MEAN OF THREE EXPERIMENTS

METHOD FOR SUPPRESSING ALGAL GROWTH IN SOLAR PONDS

BACKGROUND OF THE INVENTION

1. Field of the Invention

The invention relates to a method for suppressing growth of various types of algae which thrive in bodies of salt water, such as salt water solar ponds.

2. Description of the Prior Art

Artificial salt water solar ponds are presently used as solar collectors in order to provide a source of low grade heat for conversion into electricity. Such ponds have a 3-layer regime: an upper convective wind-mixed layer at the surface with an average salinity of 3-5% and with a depth of 30-50 cm., depending upon wind conditions; an intermediate, nonconvective layer termed a halocline, about 1-1.5 m. deep, with a salinity that increases uniformly with depth from about 5% at the top to about 30% at the bottom; and a lower heat-storage layer, from 3-5 m. deep, depending on the amount of heat storage desired, with a uniform salinity of about 30%.

Solar radiation incident on the surface is absorbed within the layers. Heat absorbed within a stratum of the wind-mixed layer reduces the density of the stratum, and creates buoyant water which quickly reaches the surface, dissipating the absorbed heat into the atmosphere. Thus, the temperature of the wind-mixed layer approximates ambient temperature. However, heat absorbed in the halocline and in the heat-storage layer is trapped in these layers. The halocline is nonconvective because the density of an underlying stratum is so large, compared with the stratum immediately above, that any decrease in density due to a temperature rise in the lower stratum as a consequence of the absorption of solar radiation is insufficient to materially change its buoyancy. As a result, solar radiation establishes a temperature profile that matches the salinity profile in the pond.

In the heat storage layer of the pond, the temperature, while not exceeding the boiling temperature of water, can nevertheless attain sufficient levels such that the water from the heat storage layer can be withdrawn, be used to perform useful work, and then be returned to the heat storage layer.

The clarity of the water in a solar pond, and particularly the clarity of the wind-mixed layer, is of primary importance, because heat absorbed in the wind mixed layer due to its turbidity is entirely lost to the system. A clear wind-mixed layer will permit solar radiation to penetrate into the halocline and even into the heat storage layer, which stores the absorbed heat for useful purposes.

Unfortunately, many microorganisms are capable of thriving even in the concentrated salt water of a solar pond. These microorganisms can thrive near the surface in the wind-mixed layer, or in the halocline of the pond. They can also thrive, and attach themselves to, nets floating on the surface of a pond which serve as windbreaks and which suppress deepening of the wind-mixed layer. Attachment of algae to the nets decreases the buoyancy of the nets and can cause them to sink, thereby reducing the effectiveness of the nets. The presence of algae on the nets also decreases light transmission through the nets such that the efficiency of the solar pond is reduced.

As mentioned above, algae growing in the wind-mixed layer of a solar pond cause turbidity which also decreases penetration of solar radiation into the pond. Moreover, these surface algae may sink at the end of their growth cycle, thus enriching the sediment at the bottom of the pond with organic matter. This enhances both bacterial activity and the production of metabolic gases in the bottom of the pond which is detrimental to the stability of the pond.

Algae growing along the shoreline of the pond, such as benthic algae, form a dark belt around the sloping sides of the pond where the precipitation of aragonite occurs. If this slimy algal biomass rises from the bottom and floats to the surface of the pond, as it sometimes does, the absorption of solar radiation is adversely affected.

The end result of excessive algal growth is always an increase in the turbidity of the water and a reduction in the depth of penetration of solar radiation into the lower levels of the solar pond, which reduces the effectiveness of the pond. When the algal growth reaches a threshold level, "blooms" are formed at or near the surface of the pond. These are cells scattered in the water which cast shadows in the pond sharply reducing the absorption of the solar radiation.

The conventional approach to reducing excessive algal growth in bodies of salt water is to utilize algacides. Other techniques include the addition of other microorganisms, such as brine shrimp, to devour the unwanted algae, and the elimination of nutrients from the pond and from make-up water, such that algae in the pond die from lack of proper nutrients. These methods often involve complicated procedures and can be very expensive to implement.

A simple and inexpensive method to decrease excessive concentrations of undesirable microorganisms in bodies of water such as solar ponds is thus desirable; and it is an object of the invention to provide a new and improved process for reducing the concentrations of various algae found in a given body of salt water.

SUMMARY OF THE INVENTION

According to the present invention, periodic and rapid changes in the salinity, and, therefore, in the density, of the wind-mixed layer are carried out, thus adversely affecting any microorganisms living in this layer.

Prolonged operation of a solar pond or other body of salt water, at a substantially constant salinity level, will encourage the growth of an increasing number of species of microorganisms which become adapted to the salinity level. Living organisms are able to adapt to a wide range of ecological conditions, provided these conditions are stable with time, and provided that a suitable time period for adaptation is available. The most difficult conditions for adaptation are those in which the environment changes rapidly. Accordingly, the method of the invention involves the introduction of a rapid change in ecological conditions, such that the algae are unable to adapt. As a result, many of the microorganisms sink to the bottom and die, and those that survive usually reproduce at a much lower level while adapting to the new ecological conditions.

By systematically introducing changes in ecological conditions at suitable time intervals, based on a knowledge of the characteristics and requirements of the microorganisms found in a particular body of water, excessive growth of any of these microorganisms can be prevented.

The preferred ecological condition for manipulation is the salinity of the water itself. Therefore, an increase or decrease in the salinity (and thereby the density) of the surface water is periodically undertaken. The anticipated range of density fluctuations should be between 1.02–1.09 g/cm$^3$, when the mixed layer is maintained at lower densities (1.05–1.06 g/cm$^3$), or, between 1.09 g/cm$^3$–1.12 g/cm$^3$, when the pond is operated at higher densities (1.10–1.11 g/cm$^3$). The direction, extent, and frequency of the changes will be determined according to the biological status of a given pond. Some algae are particularly sensitive to a sudden drop in salinity, while showing considerable resistance to high salinities. In contrast, other species exhibit optimal growth in a wide range of low salinities but seem to be sensitive to a sudden increase in salt content. It is to be kept in mind that the shifts in salinity contemplated by the present invention will not exterminate algae in the pond. However, they will keep their numbers within reasonable limits.

A rapid decrease in salinity causes the water to become a hypotonic solution which damages susceptible algae by reducing their osmotic balance and physical adaption to flotation. The hypotonic solution causes an increase in the cell volumes as water enters the cells of the susceptible microorganisms and changes their surface-to-volume ratio, thus reducing their buoyancy. As a consequence, the cells sink in the body of water. Because the temperature of the pond increases with depth in the region near the surface of the pond, the sinking cells also find themselves in a hostile temperature environment and many are eliminated for this reason. The above-mentioned reduction in buoyancy of the cells is accelerated by the reduction in the density and viscosity of the water itself caused by the decline in salinity. Moreover, cells exposed to extreme osmotic shock may burst in a few seconds and thus disintegrate. While this might not happen to every member of a particular species of undesirable organism, sufficient numbers are killed so that the problems caused by the microorganism and described above are eliminated.

A large, rapid increase in salinity causes dehydration of the organism, and will totally inhibit further growth. However, even a moderate increase in salinity will decelerate growth for a period lasting from 6 to 10 days. Cells exposed to a slightly hypertonic solution lose some water and stop reproducing temporarily. However, they continue to grow, and eventually, the aging population flocculates and sinks to the bottom of the pond. As a result, excessive numbers of organisms which are sensitive to an increase in salinity will be reduced in number thereby eliminating the nuisance caused by them.

As mentioned above, the particular regimen of steps taken, including the frequency of the addition of fresh water to the pond and the choice of raising or lowering the salt content of the pond or the density of the water, depends on the particular types of microorganisms that happen to be flourishing in the pond or body of water of interest.

BRIEF DESCRIPTION OF THE DRAWINGS

The above object, features and advantages of the present invention will be more fully apparent to those of ordinary skill in the art to which this invention pertains from the following detailed description, when considered in connection with the accompanying drawings, wherein.

DETAILED DESCRIPTION

Figure 1:
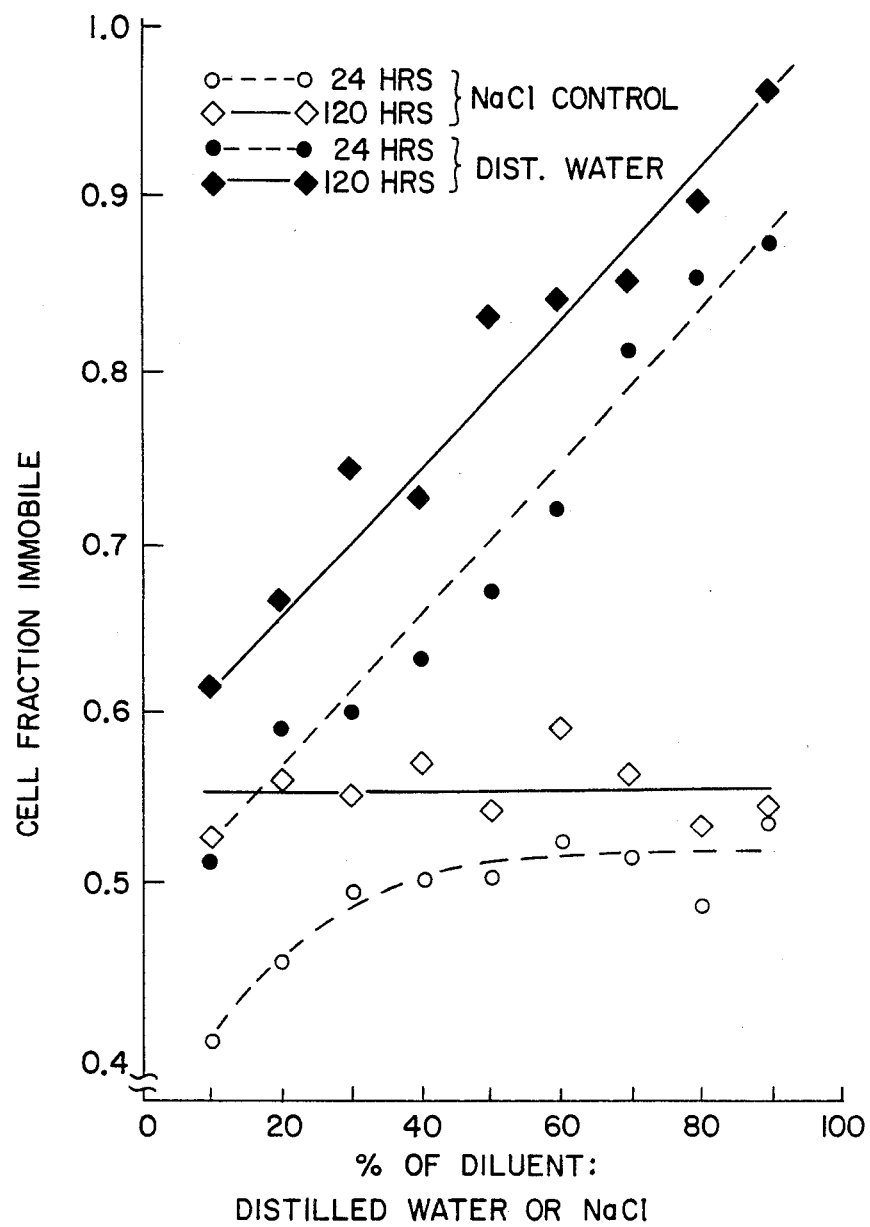
FIG. 1 is a graph showing the proportion of immobile Dunaliella cells after 1 and 5 days, as a function of increasing degree of dilution of the culture medium.

According to the inventive technique, studies are made of the levels of salt content of the pond to be treated, and the types of algae flourishing in the pond are catalogued. From previous experience with the various types of algae, it will be known whether a particular microorganism will be susceptible to a sudden increase or decrease in the salt content of the surrounding medium, and whether the increase or decrease should be a slight one or a large one, in order to prove fatal.

To achieve a rapid decrease of salinity, a suitable amount of fresh water is dispersed over the surface of the body of water to be treated. In small bodies of water, the fresh water can be dispensed from the shore line by means of hoses. In larger bodies of water an aircraft or a boat may be necessary to dispense the fresh water, which should be added quickly and in an uniform manner. The amount of time required for the dilution to take effect is likely to be one to two days, corresponding to the regeneration time of the halophilic algae.

To achieve an increase in salinity, the pond is allowed to undergo natural evaporation for a few days. Alternatively, a concentrated brine from the bottom may be pumped or sprayed on the surface.

If a net or other covering over the water body has become covered with algal growth, the net or covering will be removed and cleaned separately.

The recommended maximal range of density fluctuations should be between 1.02 and 1.09 g/cm$^3$, when the mixed layer is maintained at lower densities (1.05–1.06 g/cm$^3$), or, between 1.09 g/cm$^3$–1.12 g/cm$^3$, when the pond is operated at higher densities (1.10–1.11 g/cm$^3$). As mentioned above, the direction, extent and frequency of the changes are determined by the biological status of the pond.

If a hyposaline solution is added to the body of salt water to be treated, the susceptible algae in the body of water undergo a change in osmotic balance, and in physical adaptation to flotation. The cell volume of the sensitive organisms will increase, thus changing the surface-to-volume ratio of the cells. This promotes the sinking of the cells, which is accelerated by the change in the density of the medium, because the density is now lower compared with the density of the cell contents, because of the addition of the less dense hyposaline solution to the surface of the pond.

Because the temperature of the pond increases with depth in the region near the surface of the pond, the sinking cells also find themselves in a hostile temperature environment, and many cells are destroyed for this reason. Moreover, some of the cells exposed to extreme osmotic shock burst in a few seconds and disintegrate. Thus, a rapid decrease in the number of living algal cells can be achieved, and the dead cells will sink to the bottom of the pond and not have to be removed manually.

If it is determined that an increase in salinity is indicated, a large increase may cause dehydration and totally inhibit the growth of susceptible algae. However, even a moderate increase induces a growth lag which can last from 6 to 10 days. Cells of susceptible algae tend to lose water, and stop reproducing temporarily. However, the cells continue to grow in size. The aging population, being less able to swim or float, will sink to the bottom of the pond. Therefore, it is not necessary to remove the algae when the salinity is increased. As they sink, the algae tend to collect particles on the way, forming flocs, thus accelerating sinking.

An increase in salinity is particularly effective against benthic diatoms. These algae can float only when intensively producing oxygen via photosynthesis. An increase in salinity inhibits photosynthesis, thus decreasing the production of oxygen. As a result, the diatoms will sink. However, a decrease in salinity will also inhibit photosynthesis of diatoms, with a resulting sinking of cells.

The proper time for the introduction of salinity change into the body of water is determined by the particular susceptibilities of the microorganisms found in the body of water to be treated. The practice of the invention can be seen in the following example:

REMOVAL AND INHIBITION OF DUNALIELLA BY THE SHOCK OF DILUTION

Dunaliella is a green flagellate alga inhabiting hypersaline waters throughout the world. This alga can be effectively controlled by periodical dilution of the saline environment with fresh water.

METHODS

A well-developed buoyant culture of Dunaliella, was grown in a 1.5 M NaCl solution enriched with mineral nutrients. This solution was diluted with distilled water in the following proportions: 9:1, 8:2, 7:3, 6:4, 5:5, 4:6, 3:7, 2:8, 1:9 (i.e., increasing percentages of diluent, from 10% up to 100%). As a control, the same culture diluted in the same proportions with an unenriched solution of 1.5 M NaCl was used. All subcultures were incubated in 10 ml test tubes, under illumination of about 2000 lux, at 28° C. After a period of incubation, the concentration of Dunaliella was determined by counting cells in the upper, middle and bottom regions of each test tube. At the same time, the percentage of the immobile (non-mobile) cells was determined. The concentration of Dunaliella in the test tube diluted with distilled water was calculated as a percentage of cell concentration in the corresponding control test tube. Three sets of the diluted subcultures in the test tubes were examined: (a) after one day of incubation, (b) after two days of incubation, and (c) after five days of incubation.

RESULTS

Dilution of Dunaliella culture with distilled water had several effects:
1. Increase in cell volume and change of cell shape from an elongated form to a more spherical form.
2. Immobilization of the flagella, resulting in loss of motility;
3. Sinking of cells to the bottom;
4. Decrease in rate of cell division; and
5. Partial disintegration of cells.

DISCUSSION

Immobilization

In the experiments, a normal culture of Dunaliella in a saline medium contained about 55% of immobile cells, while the rest were motile and swimming actively. FIG. 1 demonstrates that progressive dilution of the medium with distilled water impairs motility, and increases the percentage of immobile cells. When the culture is diluted with distilled water in ratio 5:5 (50% dilution), about 80% of the Dunaliella population becomes immobile within 5 days after dilution. A 2:8 ratio (80% dilution) causes 90% immobility. Most of the immobile cells sink to the bottom.

Sinking to the bottom

The process of sinking is dilution- and time-depenedent, and is expressed by: (a) progressive decrease of Dunaliella concentration in the upper water layer (FIG. 2) and, (b) by a progressive, corresponding accumulation of the cells at the bottom of the test tube (FIG. 3).

Figure 2:
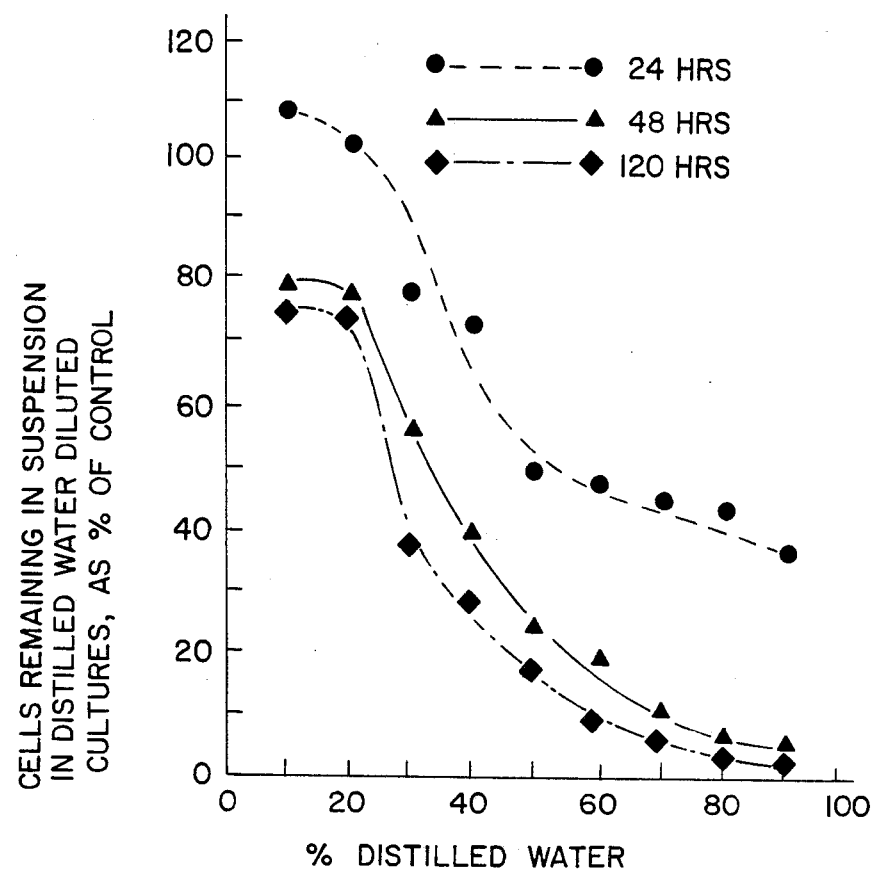
FIG. 2 is a graph depicting the percentage of Dunaliella cells remaining in suspension after dilution of the culture medium with increasing amounts of distilled water, as indicated on the abscissa, after 1, 3 and 5 days, respectively.

From FIG. 2, it is evident that even a minimal dilution of 10% (ratio 9:1) will result in removal of 25% of the Dunaliella population from the suspension by the fifth day after treatment. A dilution of 40% (ratio 6:4) will result, by the fifth day, in removal of 70% of the Dunaliella population. However, a similar extent of removal may be achieved in only two days if dilution is increased to 50% (ratio 5:5). These relationships thus leave room for manipulation in the application of the inventive method.

Figure 3:
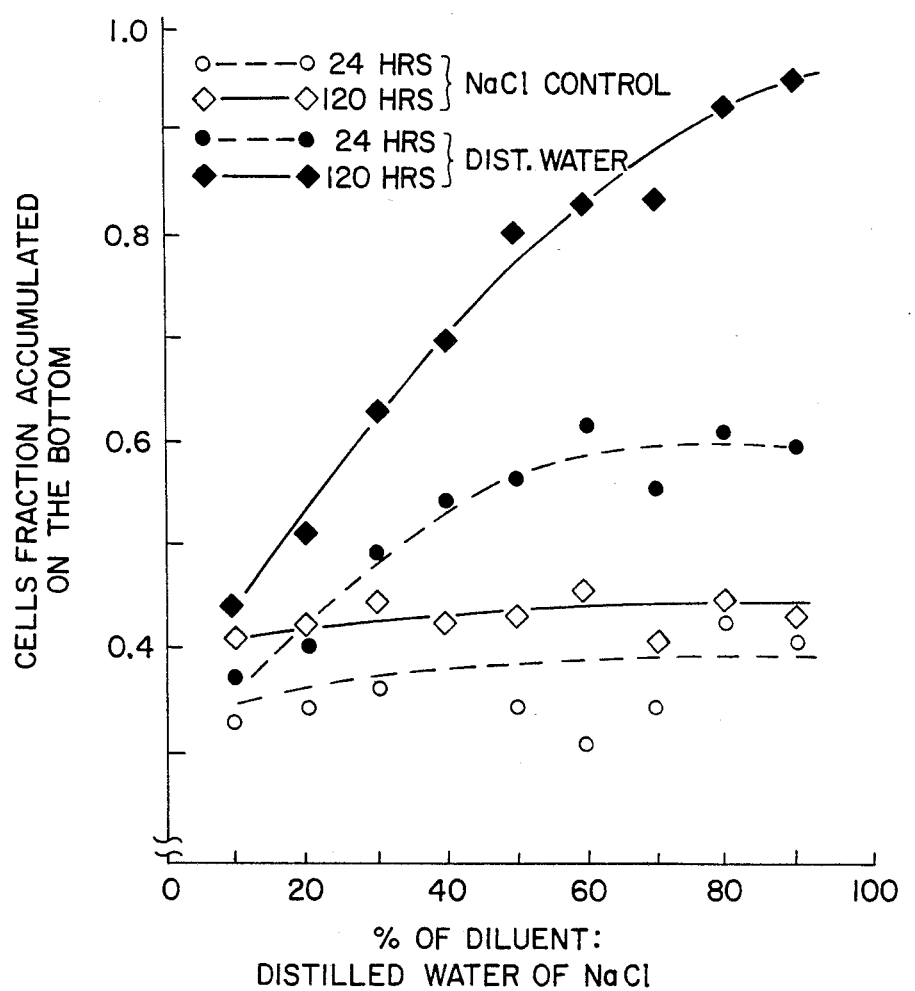
FIG. 3 is a graph depicting the fraction of total test tube population of Dunaliella which has settled at the bottom of the test tube 1 and 5 days after dilution with distilled water, with increasing dilutions by distilled water being indicated on the abscissa.

FIG. 3 reflects the progressive accumulation of the sinking Dunaliella cells at the bottom of the test tube. With increasing dilution, a growing fraction of the whole population will sink. A minimal dilution of 50% (ratio 5:5) causes about 80% of the entire population to sink to the bottom of the pond within five days.

Decrease in rate of cell division

Figure 4:
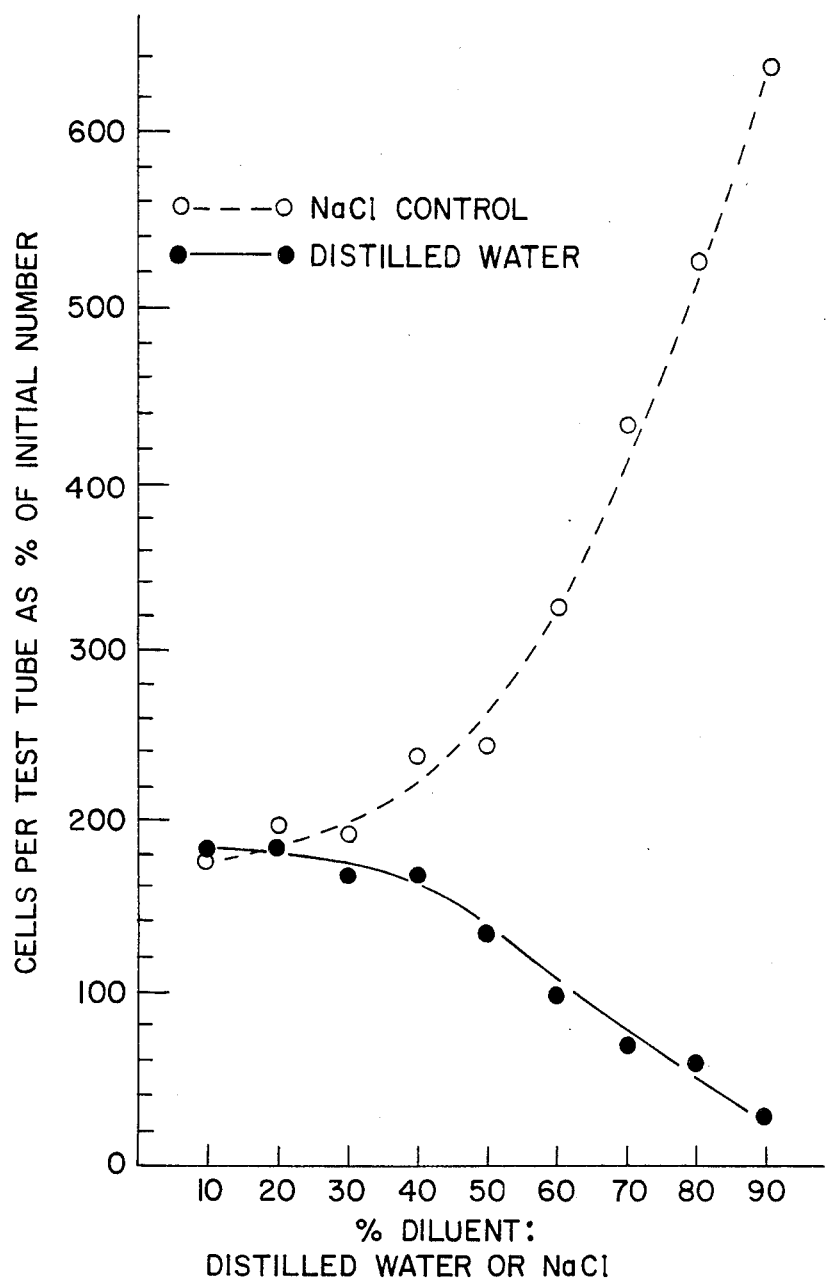
FIG. 4 is a graph plotting population increase of Dunaliella after 5 days, as a function of increasing dilution of an original culture with a NaCl control solution, and population decrease of Dunaliella after 5 days, as a function of increasing dilution of an original culture medium with distilled water.

Dilution of the Dunaliella culture with the 1.5 M NaCl solution results in stimulation of cell division (FIG. 4). In contrast to this even a moderate dilution of 10-50% with distilled water results in a considerable decrease in the rate of cell division.

Disintegration of the cells

Dilutions of 60% and more result in disintegration of Dunaliella cells and a drop in the population to about 20% or less of the initial level.

As the accumulation of organic matter in the form of dead algae in the lower water mass of the pond, or at the very bottom of the pond might adversely affect the functioning of the pond, the inventive method will be practiced on a constant time schedule, suppressing and decimating the algal population continuously. In this way, only a very small amount of organic debris will sink at any one time. This gradual addition of organic matter in the lower regions of the pond can then be dealt with through the use of bacterial decomposers.

It is to be understood that the above-described example is provided for purposes of illustration only, and that other variations of the invention are possible, depending on the particular biological status of a given body of water.

It is believed that the advantages and improved results furnished by the method of the present invention are apparent from the foregoing description of the preferred embodiment of the invention. Other changes may be made without departing from the spirit and scope of the invention as described in the claims that will follow.

I claim:

1. A process for controlling algal growth in the wind-mixed layer of a salt water solar pond having a halocline located below the wind-mixed layer and a heat storage layer located below the halocline, wherein the halocline has a downwardly directed salt gradient and a temperature profile that follows the salinity profile, comprising rapidly changing the salinity in the wind-mixed layer for rapidly changing the osmotic pressure on algae in the wind-mixed layer which are sensitive to rapid changes in ambient salinity by an amount effective to cause such algae therein to sink into a region of increased temperature.

2. A process according to claim 1 wherein the salinity is rapidly increased for causing the algal cells to dehydrate, flocculate and sink.

3. A process according to claim 1 wherein the salinity is rapidly decreased for causing the algal cells to sink.

4. A process for controlling algal growth in the wind-mixed layer of a salt water solar pond having a halocline located below the wind-mixed layer and a heat storage layer located below the halocline, wherein the halocline has a downwardly directed salt gradient and a temperature profile that follows the salinity profile, comprising:

(a) evaluating the types of algae growing in the wind-mixed layer to determine their sensitivity to salinity and density changes;

(b) producing treatment water, which when added to the wind-mixed layer, will adjust its salinity and density to levels at which the osmotic pressure on the algae is harmful to the normal functioning of the algae; and (c) periodically, rapidly adding said treatment water to the wind-mixed layer for rapidly changing the osmotic pressure on the algae, said treatment water being added in an amount effective to cause the algae therein to sink into a region of increased temperature.

5. A process according to claim 4 wherein the salinity of the treatment water exceeds the salinity of wind-mixed layer for causing the algal cells to dehydrate, flocculate and sink.

6. A process according to claim 4 wherein the salinity of the treatment water is less than the salinity of the wind-mixed layer for causing the algal cells to sink.

* * * * *